(12) United States Patent
Hirakawa et al.

(10) Patent No.: US 9,759,003 B2
(45) Date of Patent: Sep. 12, 2017

(54) PROTECTOR WITH SENSOR (71) Applicant: NISHIKAWA RUBBER CO., LTD., Hiroshima-shi, Hiroshima-ken (JP)

(72) Inventors: Yuzo Hirakawa, Hiroshima (JP); Kano Hikiji, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 0 days.

(21) Appl. No.: 14/940,738

(22) Filed: Nov. 13, 2015

(65) Prior Publication Data

US 2016/0145927 A1    May 26, 2016

(30) Foreign Application Priority Data

Nov. 21, 2014    (JP) ................................ 2014-236610

(51) Int. Cl.
*E05F 15/44*         (2015.01)
*B60R 16/02*         (2006.01)
(Continued)

(52) U.S. Cl.
CPC ........... *E05F 15/443* (2015.01); *B60J 10/246* (2016.02); *B60J 10/273* (2016.02);
(Continued)

(58) Field of Classification Search
CPC   B60J 10/17; B60J 10/27; B60J 10/273; E05F 15/44; E05F 15/443
See application file for complete search history.

(56) References Cited

U.S. PATENT DOCUMENTS 2,702,416 A * 2/1955 Bright .................... B60J 10/24
49/490.1
5,023,418 A * 6/1991 Beckhausen .............. F16P 3/12
187/317
(Continued)

FOREIGN PATENT DOCUMENTS

DE    10133417 A1 *  1/2003 ............. B60J 10/24
EP     0638701 A2    2/1995
(Continued)

OTHER PUBLICATIONS

Extended European Search Report issued by the European Patent Office in relation to Application 15193162.3-1757 dated Apr. 13, 2016 (9 pages).

*Primary Examiner* — Katherine Mitchell
*Assistant Examiner* — Catherine A Kelly
(74) *Attorney, Agent, or Firm* — Robert P. Michal, Esq.; Carter, DeLuca, Farrell & Schmidt, LLP (57) ABSTRACT

A protector with a sensor operatively coupled on a sliding door detects an object by touch between two conductive parts in a hollow part with a space therebetween. The two conductive parts including a conductive part on a lower part of the hollow part as a side of the installation base member and a conductive part on an upper part of the hollow part as a side of a top end are shaped and positioned in a manner that an inner-cabin side end and an outer-cabin side end of the space are continuously provided directly on an inner peripheral surface of the hollow part. A coating layer covers at least an outer peripheral surface of the outer coat of the hollow part having the inner-cabin side end and the outer-cabin side end of the space continuously provided directly on the inner peripheral surface thereof.

12 Claims, 9 Drawing Sheets

(51) Int. Cl.
*B60J 10/246* (2016.01)
*B60J 10/273* (2016.01)
*H01H 3/14* (2006.01)

(52) U.S. Cl.
CPC .......... *B60R 16/0215* (2013.01); *E05F 15/44* (2015.01); *H01H 3/142* (2013.01); *E05Y 2800/272* (2013.01); *E05Y 2900/50* (2013.01)

(56) References Cited

U.S. PATENT DOCUMENTS

| | | | | |
|---|---|---|---|---|
| 5,834,719 | A * | 11/1998 | Kaji | B60J 10/00 200/61.43 |
| 5,920,044 | A * | 7/1999 | Kaji | B60J 10/00 200/61.44 |
| 6,107,580 | A * | 8/2000 | Hoshikawa | H01H 3/142 200/61.43 |
| 6,233,872 | B1 * | 5/2001 | Glagow | E05F 15/443 49/27 |
| 6,368,700 | B1 * | 4/2002 | Venkataswamy | B32B 27/08 428/195.1 |
| 6,389,752 | B1 * | 5/2002 | Rosenau | E05F 15/443 49/28 |
| 6,849,310 | B2 * | 2/2005 | Willett | B60J 10/248 296/93 |
| 6,896,268 | B2 * | 5/2005 | Hofmann | B60J 10/00 200/61.43 |
| 7,082,721 | B2 * | 8/2006 | Whitehead | B60J 10/00 277/919 |
| 7,712,256 | B2 * | 5/2010 | Kato | E05F 15/46 200/61.43 |
| 7,958,672 | B2 * | 6/2011 | Ishihara | E05F 15/46 200/61.43 |
| 8,336,255 | B2 * | 12/2012 | Shimizu | E05F 15/70 49/27 |
| 8,752,332 | B2 * | 6/2014 | Thiele | B60J 5/06 49/27 |
| 9,114,691 | B2 * | 8/2015 | Kawaguchi | B60J 5/0495 |
| 9,422,760 | B2 * | 8/2016 | Matsuda | E05F 15/0008 |
| 2002/0033581 | A1 * | 3/2002 | Nolles | B60J 10/24 277/628 |
| 2005/0048263 | A1 | 3/2005 | Ford et al. | |
| 2015/0267462 | A1 * | 9/2015 | Matsumoto | B29C 45/14065 73/862.541 |

FOREIGN PATENT DOCUMENTS

| | | | |
|---|---|---|---|
| EP | 0638701 A3 | 4/1995 | |
| EP | 0767475 A2 | 4/1997 | |
| EP | 0767475 A3 | 10/1998 | |
| EP | 1319788 A2 | 6/2003 | |
| EP | 1319788 A3 | 2/2006 | |
| FR | EP 1123827 A1 * | 8/2001 | ............ B60J 10/24 |
| JP | 11283462 | 10/1999 | |
| JP | 2008-044590 A | 2/2008 | |
| WO | WO-00/57013 A1 | 9/2000 | |

* cited by examiner

| coating resin | hardness (Shore D) | ON load (N) | number of rub before appearance of crack (time) | judgement | remarks |
|---|---|---|---|---|---|
| none | none | 7.5 | 1 | × | number of rub before appearance of crack NO GOOD |
| A | 7 | 8.7 | 10 | ○ | |
| B | 25 | 14.7 | 520 | ○ | |
| C | 52 | 18.7 | 710 | ○ | |
| D | 69 | 27.8 | 800 | × | ON load NO GOOD |

PROTECTOR WITH SENSOR

CROSS REFERENCE TO RELATED APPLICATION

This application claims the benefit under 35 USC §119 of JP Patent Application JP 2014-236610 filed Nov. 21, 2014, the entire disclosure of which is incorporated herein by reference.

BACKGROUND INFORMATION

The present invention relates to protectors with sensors. When objects including fingers are disposed between openings of automobiles and panels which move between at least two positions to open and close the openings of automobiles, the sensors of the protectors output corresponding signals for detecting the objects. The panels include: doors such as sliding doors on wagons, station wagons or the like sliding frontward and rearward of the automobile bodies and back doors; and sun roofs.

Figure 6:
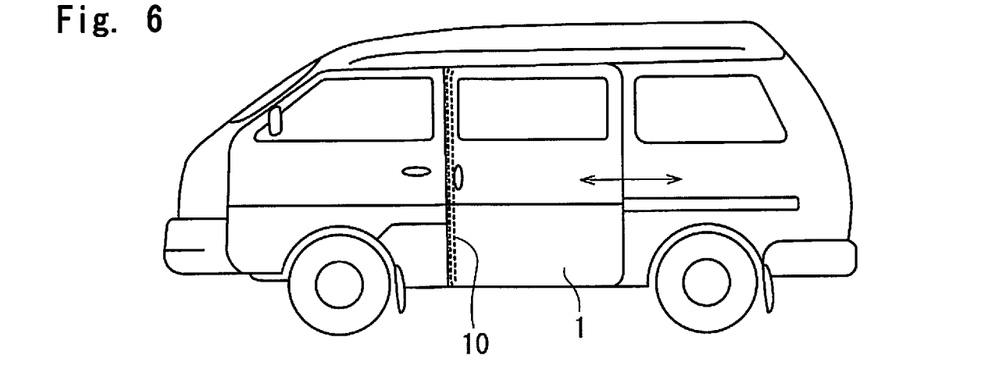
FIG. 6 is a side view of an automobile which opens or closes by a sliding door.
Figure 7:
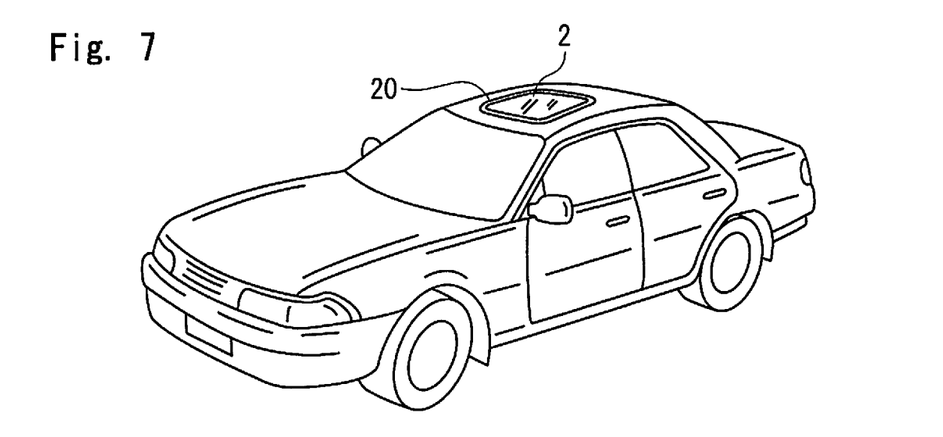
FIG. 7 is a perspective view of an automobile with a sun roof.

A protector 10, 20 with a sensor is installed on an automobile including a wagon shown in FIG. 6 of which a sliding door 1 (or a back door) moves between at least two positions to open and close an opening of an automobile body or on an automobile shown in FIG. 7 of which sun roof 2 opens or closes the opening of the automobile body.

Figure 8:
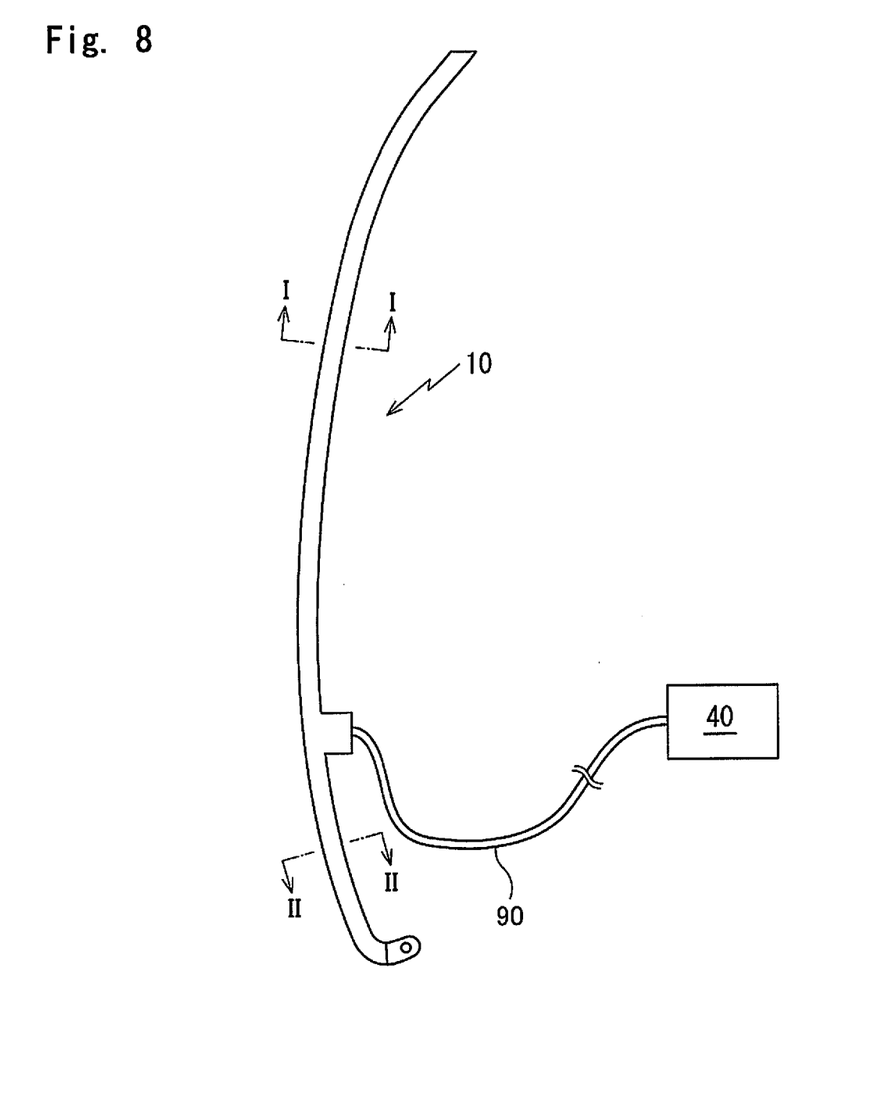
FIG. 8 is a side view of the protector with the sensor of FIG. 6.

For example, the protector 10 with the sensor, extending in an upper and lower direction as shown in FIG. 8, is installed on a front end surface of the sliding door 1. The protector 10 with the sensor extends frontward of the automobile body from the front end surface of the sliding door 1.

Figure 9:
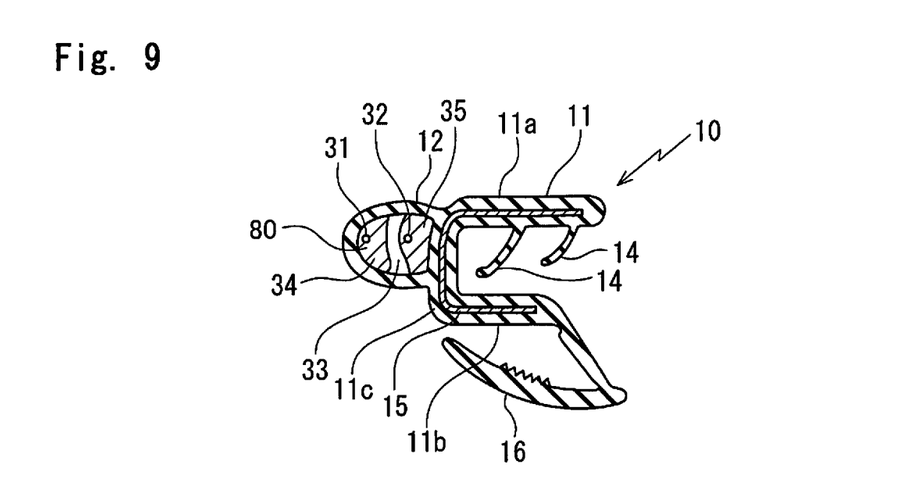
FIG. 9 is an I-I line enlarged cross section of FIG. 8, showing a protector with a sensor.
Figure 10:
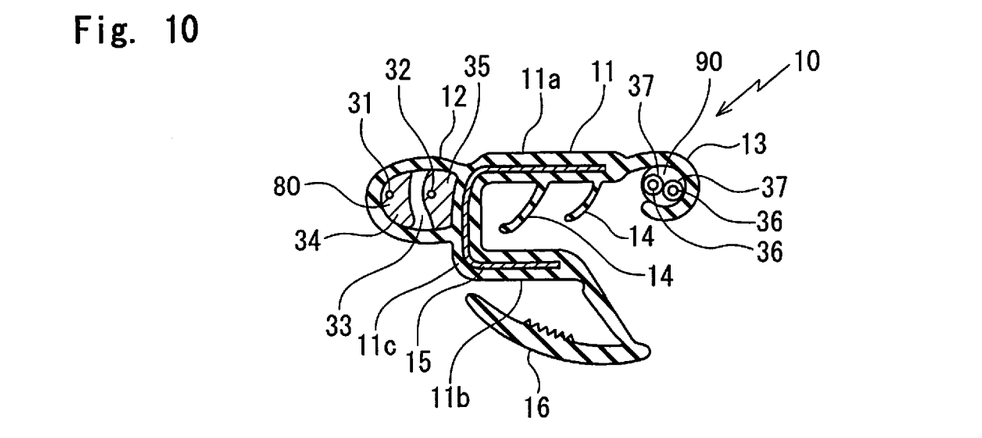
FIG. 10 is an II-II line enlarged cross section of FIG. 8, showing the protector with the sensor.

As shown in FIG. 9 and FIG. 10, the protector 10 with the sensor, installed on the front end surface of the sliding door 1 includes: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 includes a sensor (pressure sensitive sensor) 80 which outputs a corresponding electric signal upon detecting the object such as a part of human bodies (fingers, hands or legs) between the sliding door 1 and a body side opening (may also be front door or side door) (see, for example, Japanese unexamined Patent Publication No. 2008-44590).

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in rubber like elastic bodies (conductive parts) 34, 35 having conductivity with a space 33 therebetween, which are fixed in the hollow part 12. As the object is disposed between the sliding door 1 and the body side opening when the sliding door 1 is moved towards a closed position, the object makes contact with a part of the hollow part 12, and then the rubber like elastic bodies 34, 35 contact with each other and the two core wires 31, 32 short. Resultant change in electric signal is transmitted to a control unit 40 joined with leads 36, 36 which are connected with the two core wires 31, 32 in a lower side terminal part of the protector 10 with the sensor, and as a result, the objects are detected. The leads 36, 36 covered with insulator are tied by the wire harness 90. Top ends of the leads 36, 36, bared from covered parts 37, 37 are naked wires.

Parts of an inner peripheral surface of the hollow part 12, on which the two rubber like elastic bodies (conductive parts) 34, 35 having conductivity are embedded, are thick in thickness and strong in strength. But other parts of the inner peripheral surface of the hollow part 12 without the conductive parts 34, 35, in other words, the parts of the inner surface of an outer coat of the hollow part 12 in cross section, on which both ends 33a, 33b of a space 33 are continuously provided, are thin in thickness and weak in strength. Accordingly, as shown in FIG. 11, as convex substances 400, automobile keys for example, strongly abut the other parts which are weak in strength while getting on or off the automobiles, the other parts may be damaged or cracked.

Figure 11:
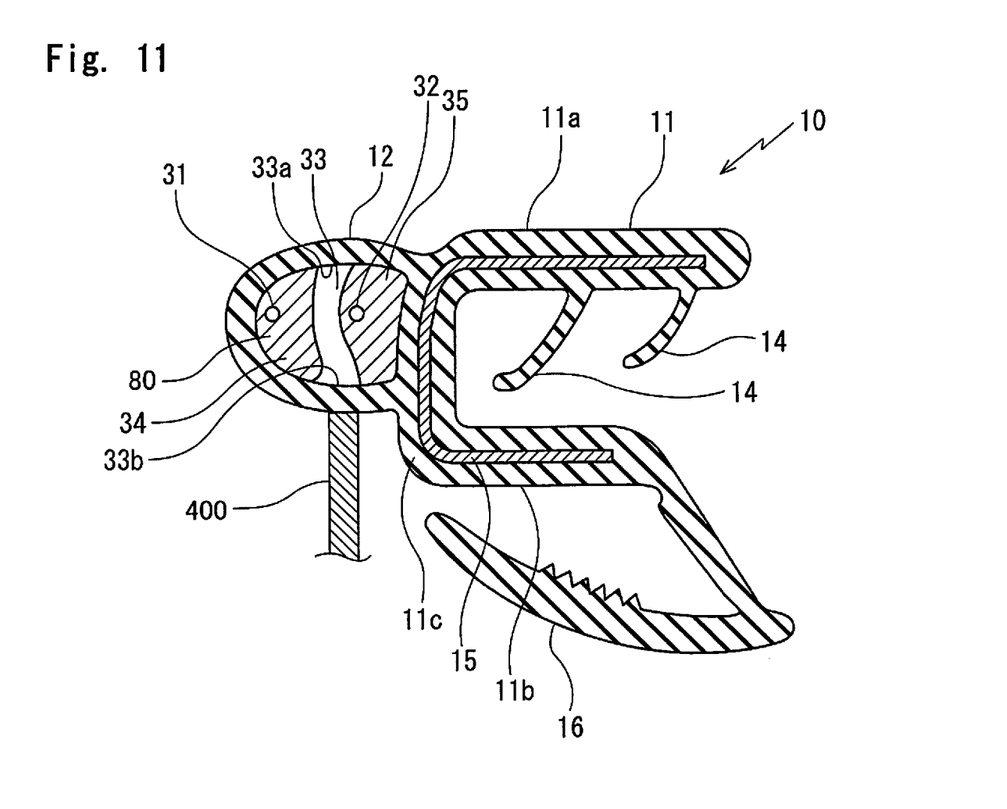
FIG. 11 is an enlarged cross section showing a state that a convex substance including an automobile key abuts the protector with the sensor of FIG. 9.

The space 33 of FIG. 11 substantially has an oblong shaped (rectangular shaped) cross section. But, depending on shapes or positions of the rubber like elastic bodies 34, 35, the parts of the inner surface of the outer coat of the hollow part 12, on which the both ends 33a, 33b of the space 33 are continuously provided, may be on a side of the installation base member 11 relative to the shape of the hollow part 12 in cross section. In this structure, the parts of the inner surface of the outer coat of the hollow part 12, on which the both ends 33a, 33b of the space 33 are continuously provided, are on positions especially easy to catch the convex substances 400. The structure increases a risk of damages or cracks on the parts.

Once the hollow part 12 cracks, rainwater or water for car washing enters and sensor function is lost. As a result, the structure may cause malfunction including improper opening or closing of the sliding door 1 or the sun roof 2.

It is to be noted that Japanese unexamined Patent Publication No. 2008-44590 aims at fully achieving restoring force of the hollow part after being pressed by: integrally forming a hollow part and a holding part joined to the hollow part through a connection part by thermoplastic elastomer; and forming an inner wall layer on an upper part of an inner surface of the hollow part and a swelled part on a lower part of the inner surface by mixed synthetic resin prepared by mixing carbon by 10% by weight or more with thermoplastic elastomer. But Japanese unexamined Patent Publication No. 2008-44590 does not prevent the damages or cracks on the thin parts of the hollow part when the convex substances 400, automobile keys for example, abut the thin parts, or does not disclose a conception for solving above-mentioned problems.

In addition, since the hollow part and the holding part are connected by the singular connection part, slipping-off of the hollow part may hamper a stable sensor function.

Therefore, an object of the present invention is to provide the protectors with sensors capable of preventing the damages caused by the objects which abut the hollow parts.

SUMMARY

In order to achieve the above-mentioned object, according to one aspect of the invention, a protector with a sensor is provided, the protector with the sensor including: an installation base member (11) operatively coupled on a peripheral edge of a panel which moves between at least two positions to open and close an opening of an automobile body or on a peripheral edge of said opening of the automobile body, the panel including a door (1) and a sun roof (2) of an automobile; and a hollow part (12) unified with the installation base member (11), the hollow part (12) having a shape of a tube, the hollow part (12) having core wires (31, 32), two conductive parts (34, 35, 54, 55) and a space (33, 53) provided therein, the two conductive parts (34, 35, 54, 55) having the core wires (31, 32) embedded therein respectively, the space (33, 53) being positioned between the two conductive parts (34, 35, 54, 55); an inner-cabin side end (12*a*) and an outer-cabin side end (12*b*) of the hollow part (12) being connected with the installation base member (11), the inner-cabin side end (12*a*) and the outer-cabin side end (12*b*) being at a distance from each other in which:

when an object is disposed between said panel and said opening, and makes contact with said hollow part (12) when said panel is moved towards a closed position, a corresponding change in electric signal detects said object; and in a terminal part, said core wires (31, 32) drawn out in a longitudinal direction are connected with two leads (36, 36), said two leads (36, 36) being joined with a control unit (40), wherein:

said two conductive parts (34, 35, 54, 55) include a conductive part (35, 55) on a lower part of the hollow part and a conductive part (34, 54) on an upper part of the hollow part, the lower part of the hollow part being a side of said installation base member (11), the upper part of the hollow part being a side of a top end of the hollow part; said two conductive parts (34, 35, 54, 55) are shaped and positioned in a manner that an inner-cabin side end (33*a*, 53*a*) and an outer-cabin side end (33*b*, 53*b*) of said space (33, 53) are continuously provided directly on an inner peripheral surface of an outer coat of said hollow part (12); and a coating layer (100) covers at least an outer peripheral surface of the outer coat of said hollow part (12) having the inner-cabin side end (33*a*, 53*a*) and the outer-cabin side end (33*b*, 53*b*) of said space (33, 53) continuously provided directly on the inner peripheral surface thereof.

It is to be noted that the "change in electric signal" includes a change by short between the two core wires, and a change in capacitance.

In addition, according to an aspect of the present invention, the coating layer (100) covers a surface of the outer coat of the hollow part (12) from the inner-cabin side end (12*a*) to the outer-cabin side end (12*b*) of the hollow part (12) without any interval.

In addition, according to an aspect of the present invention, the invention pays attention to a hardness of a material forming the coating layer (100) and the hardness is equal to or less than a hardness at which at least said electric signal is obtained.

In addition, according to an aspect of the present invention, Shore D hardness of the material forming the coating layer (100) is not more than 47.

Shore D hardness is a standardized test consisting in measuring the depth of penetration of a specific indenter. The higher the value, the higher the hardness. The Shore D test is used when the material is too soft to be measured by a Rockwell test. The Shore hardness is measured with an apparatus known as a Durometer. Shore D hardness is the same as: JIS K 6253, durometer type D; and ASTM D2240, durometer type D.

In addition, according to an aspect of the present invention, the conductive part (55) on the lower part of the hollow part has a convex shape and the conductive part (54) on the upper part of the hollow part has a concave shape, and said two conductive parts (54, 55) are shaped and positioned in a manner that said space (53) substantially has a V-shaped cross section, said space (53) substantially has a uniform width in cross section and an opening of the V-shaped cross section faces the side of said installation base member (11).

In addition, according to an aspect of the present invention, the coating layer (100) is integrally molded with the hollow part (12).

In addition, according to an aspect of the present invention, the coating layer (100) is formed on the hollow part (12) by application.

In addition, according to an aspect of the present invention, said installation base member (11), said hollow part (12), said conductive parts (34, 35, 54, 55) and said core wires (31, 32) are integrally molded.

Symbols in parentheses show constituents or items corresponding to the drawings.

According to the present invention, the hollow part has the coating layer formed thereon for covering at least the outer peripheral surface of the outer coat of the hollow part while the inner-cabin side end and the outer-cabin side end of the space are continuously provided directly on the inner peripheral surface of the hollow part. Accordingly, even in case convex substances 400, automobile keys for example, strongly abut the hollow part while getting on or off the automobiles, the structure decreases an impact on the hollow part caused by abutment and efficiently prevents damages or cracks on thin parts of the hollow part.

The simple structure that the coating layer covers the hollow part prevents loss of sensor function caused by water entering from the hollow part, and malfunction including improper opening or closing of the sliding door or the sun roof.

In this connection, coating a sealing part with a bonded component including polyester has been well known (see, for example, Japanese examined Utility Model Publication No. 2587880). But the prior arts aim at coating surfaces of seal lips or hollow seal parts of glass runs or door weather strips for the automobiles. In other words, the prior arts do not aim at coating hollow parts which function as the sensors of the protectors with sensors as in the present invention.

This is because of the following reasons: it was clarified for the first time that the damages or cracks on the hollow parts, caused by the abutment of the convex substances including automobile keys while getting on or off the automobiles, result in decline in sensor function; and covering the surfaces of the outer coats of the hollow parts with the coating layers is widely believed to lower sensing capability of the sensors. As a result, it has been unthinkable to cover the hollow parts of the protectors with sensors with the coating layers.

In this connection, an applicant of the present invention provides the coating layers which cover the outer coats for securing strength of the hollow parts while also securing the sensing capability of the sensors.

In addition, the invention pays attention to the hardness of the material forming the coating layer and the hardness is equal to or less than the hardness at which at least the electric signal is obtained. The material preferably has the Shore D hardness of not more than 47.

The prior arts do not choose the materials of the coating layers formed on the hollow parts based on the hardness.

The coating layer at least covers the outer peripheral surface of the outer coat on the thin parts of the hollow part without the two conductive parts. The thin parts are formed by continuously providing the inner-cabin side end and the outer-cabin side end of the space directly on the inner peripheral surface of the hollow part. But the coating layer may cover the whole outer peripheral surface of the outer coat of the hollow part. The coating layer may be integrally molded with the hollow part by simultaneous extrusion. Alternatively, parts other than the coating layer may be formed first; and secondly, the coating layer may coat the hollow part by means of an extruder or the coating layer may be formed on the hollow part by application by means of painting tools.

Forming the coating layer by application enables simple and instantaneous formation of the coating layer on appropriate parts of the hollow part. On the other hand, the coating layer formed by integral molding is firm on the hollow part, which is uniform in thickness without unevenness as compared with the coating layer formed by application.

In addition, the conductive part having the concave shape on the upper part of the hollow part and the conductive part having the convex shape on the lower part of the hollow part are provided in the hollow part in the manner that the space between the two conductive parts substantially has the V-shaped cross section, the space substantially has the uniform width in cross section and the opening of the V-shaped cross section faces the side of the installation base member. Accordingly, as compared with a space substantially having an oblong shaped (rectangular shaped) cross section, a movable range of the hollow part which bends for detecting objects is wider. The structure enables detection of the objects over wider ranges on the inner-cabin side and the outer-cabin side.

In addition, the installation base member, the hollow part, the conductive parts and the core wires are integrally molded. The structure enables to stably produce the protector with the sensor in a shorter time for operation.

The installation base members, the hollow parts, the conductive parts and the core wires of ordinary protectors with the sensors have not been integrally molded.

BRIEF DESCRIPTION OF THE DRAWINGS

FIG. 3(a) and FIG. 3(b) are I-I line enlarged cross sections of FIG. 8, showing other protectors with sensors according to the embodiment of the present invention, of which FIG. 3(a) shows that both ends of a coating layer are elongated and FIG. 3(b) shows that the coating layers are partially provided;

DETAILED DESCRIPTION

Referring to the Drawings, a protector with a sensor according to an embodiment of the present invention will be described. It is to be noted that words "a front and a rear" indicate a front direction and a rear direction relative to an automobile. The words "upper and lower" used with respect to the automobile indicate an upper direction and a lower direction relative to the automobile. As to the words "upper and lower" used with respect to a protector 10 with a sensor, the word "upper" indicates a side of a hollow part 12 and the word "lower" indicates a side of an installation base member 11.

The protector 10 with the sensor of the embodiment of the present invention, which extends toward a front side of an automobile body is installed on a front end surface of a sliding door 1 of an automobile shown in FIG. 6 of which the sliding door 1 moves between at least two positions to open and close an opening of the automobile body. A sensor (pressure sensitive sensor) 80 installed on the protector 10 with the sensor outputs corresponding electric signal upon detecting an object such as a part of human body (finger, hand or leg) between the sliding door 1 and a body side opening (may also be front door or side door). Both the present invention and the prior art include the structures of FIG. 8. But FIG. 1 of the present invention, which is an I-I line enlarged cross section of a part of FIG. 8 with a sensor (pressure sensitive sensor) 80, is different from the prior art shown in FIG. 9 in that a coating layer 100 covers an outer coat of the hollow part 12. When constituents or items correspond to those in prior arts, the same symbols are used.

Figure 1:
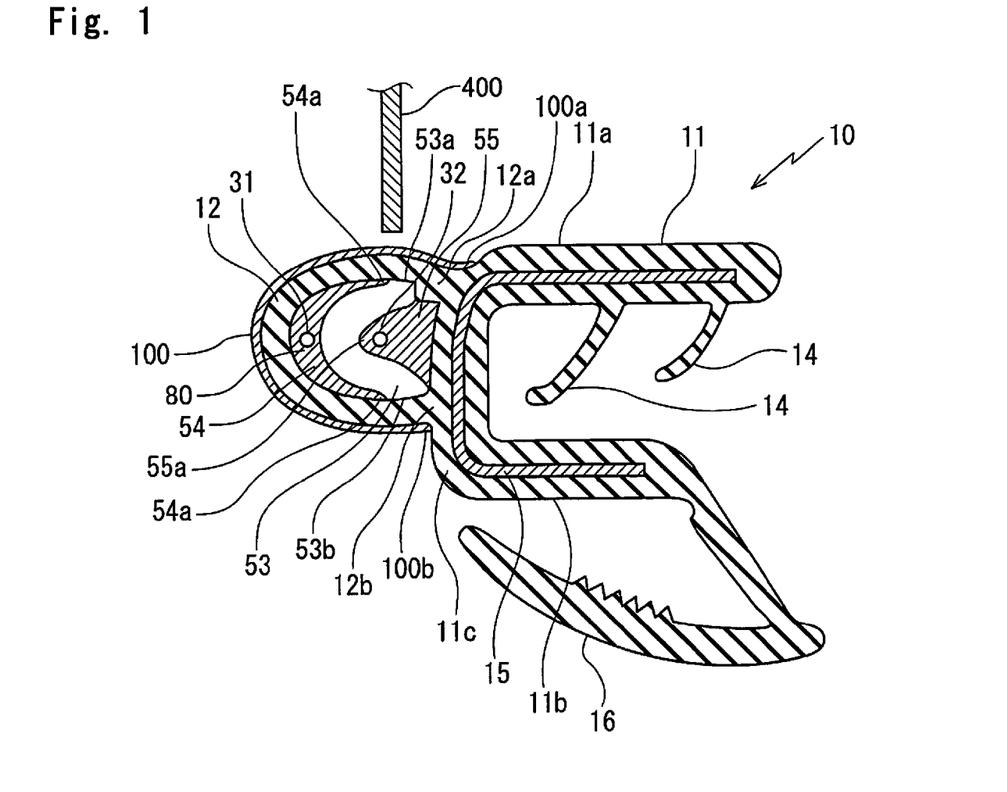
FIG. 1 is an I-I line enlarged cross section of FIG. 8, showing a protector with a sensor according to an embodiment of the present invention.

As shown in FIG. 1, the protector 10 with the sensor includes: the installation base member 11 having a substantially U-shaped cross section including an inner-cabin side wall 11a, an outer-cabin side wall 11b and a connecting wall 11c, which is operatively coupled on a flange (not shown) formed on a sliding door 1 directly; a hollow part 12 which is integrally molded with the installation base member 11, which has a shape of a tube and which makes elastic contact with the object when the object including a finger is disposed between a front end surface of the sliding door 1 and a body side opening which faces the front end surface when the door 1 is moved towards a closed position; and the sensor (pressure sensitive sensor) 80 which is incorporated in the hollow part 12 and which outputs a corresponding electric signal upon detecting the object. The sensor (pressure sensitive sensor) 80 has two core wires (electrode wires) 31, 32 extending in an upper and lower direction (longitudinal direction) embedded in rubber like elastic bodies 54, 55 having conductivity with a space 53 therebetween, which are fixed in the hollow part 12. The rubber like elastic bodies 54, 55 having conductivity are made of conductive rubber mainly including synthetic rubber including EPDM. The sensor 80 is integrally molded with the hollow part 12 without conductivity.

The installation base member 11 has a plurality of holding lips 14, 14 formed inside and a core 15 having a substantially U-shaped cross section embedded therein for increasing rigidity. In addition, a decorative lip 16 is provided on the outer-cabin side wall 11b of the installation base member 11.

The hollow part 12 is integrally molded with the connecting wall 11c of the installation base member 11. A top end of the hollow part 12 protrudes toward a front side of the automobile.

Both ends (an inner-cabin side end) 12a, (an outer-cabin side end) 12b of the hollow part 12 are connected with the connecting wall 11c of the installation base member 11. The both ends 12a, 12b are at a distance from each other in an inner and outer cabin direction.

The rubber like elastic bodies 54, 55 having conductivity are conductive parts. The conductive parts include: a conductive part 55 on a lower part of the hollow part 12, which is a side of the installation base member 11 of the hollow part 12; and a conductive part 54 on an upper part of the hollow part 12, which is a side of a top end of the hollow part 12. The conductive part 54 on the upper part of the hollow part 12 has a core wire 31 embedded at a center thereof and the conductive part 55 on the lower part of the hollow part 12 has a core wire 32 embedded at a center thereof.

Positions in the hollow part 12 as well as shapes of the conductive part 54 on the upper part of the hollow part and the conductive part 55 on the lower part determine a shape of the space 53 in cross section between the two conductive parts 54, 55. In the present embodiment, the two conductive parts 54, 55 are shaped and positioned in a manner that the space 53 substantially has a V-shaped cross section, substantially has a uniform width in cross section and an opening of the V-shaped cross section faces the side of the installation base member 11. Also, an inner-cabin side end 53a and an outer-cabin side end 53b of the space 53 are continuously provided directly on an inner peripheral surface of the hollow part 12 (inner peripheral surface of the outer coat of the hollow part 12). A part of the inner-cabin side end 53a or the outer-cabin side end 53b may be continuously provided directly on the installation base member 11.

The conductive part 55 on the lower part of the hollow part substantially has a ridge-shaped cross section, a base of which comes into contact with the connecting wall 11c of the installation base member 11. The conductive part 54 on the upper part of the hollow part substantially has a crescent-shaped cross section, both ends of which fall from the top end of the hollow part 12 in a manner to approach the connecting wall 11c of the installation base member 11.

In addition, lower parts 54a of the conductive part 54 on the upper part of the hollow part are closer to the installation base member 11 than a tip 55a of the conductive part 55 on the lower part of the hollow part. Accordingly, even slight bending easily touches the two conductive parts 54, 55 to each other, and the two conductive parts 54, 55 do not pass each other on a point of contact. In addition, an axis of symmetry bilaterally divides the two conductive parts 54, 55 and the space 53 in the hollow part 12 as well as the hollow part 12 into two equal halves in a direction of an inner-cabin side and in a direction of an outer-cabin side. Also, the core wires 31, 32 are on the axis of symmetry. In general, the rubber like elastic bodies 54, 55 having conductivity include solid materials without air bubbles therein.

Figure 2:
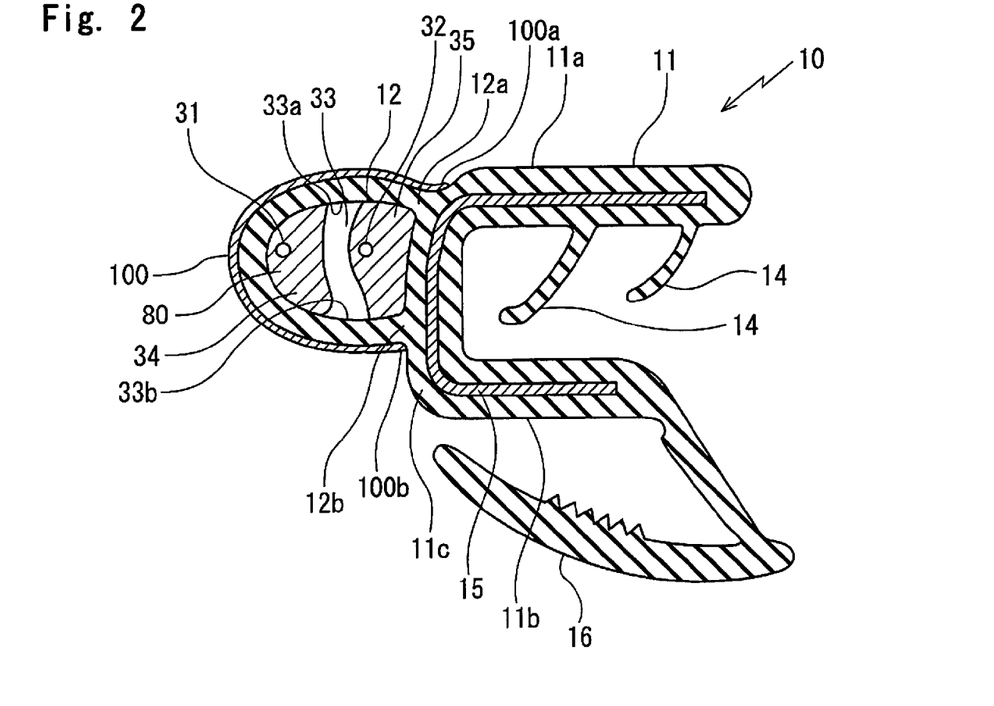
FIG. 2 is an I-I line enlarged cross section of FIG. 8, showing another protector with a sensor according to the embodiment of the present invention.

As shown in FIG. 2, the space 33 may substantially have an oblong shaped (rectangular shaped) cross section as in the prior art (FIG. 11). But the space 53 substantially having the V-shaped cross section (FIG. 1) widens a movable range of the outer coat of the hollow part 12 for detecting objects. The structure of FIG. 1 enables detection of the objects over wider ranges on the inner-cabin side and the outer-cabin side.

The installation base member 11 and the hollow part 12 of the protector 10 with the sensor form an extrusion molded part made of a rubber like elastic body without conductivity including: synthetic rubber such as EPDM; and thermoplastic elastomer such as TPO, TPS. The upper and lower side terminal parts of the protector 10 with the sensor relative to the automobile are die molded for arranging an external shape thereof. Since the hollow part 12 of the protector 10 with the sensor necessitates flexibility, the hollow part 12 may include a foamed sponge material. In the same manner, the installation base member 11 may include the foamed sponge material.

The outer coat (wall forming the hollow part) of the hollow part 12 has the coating layer 100 formed thereon for covering the outer peripheral surface thereof from an outer side.

The coating layer 100 is integrally molded with the hollow part 12. The coating layer 100 continuously covers a surface of the outer coat of the hollow part 12 from the inner-cabin side end 12a to the outer-cabin side end 12b of the hollow part 12 without any interval.

Figure 3A:
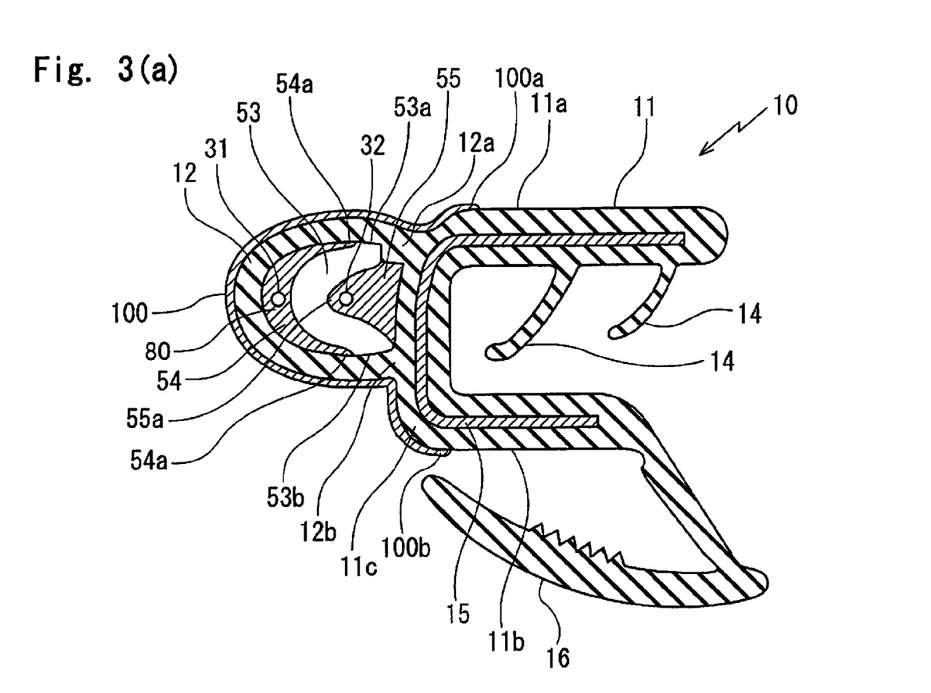
Figure 3B:
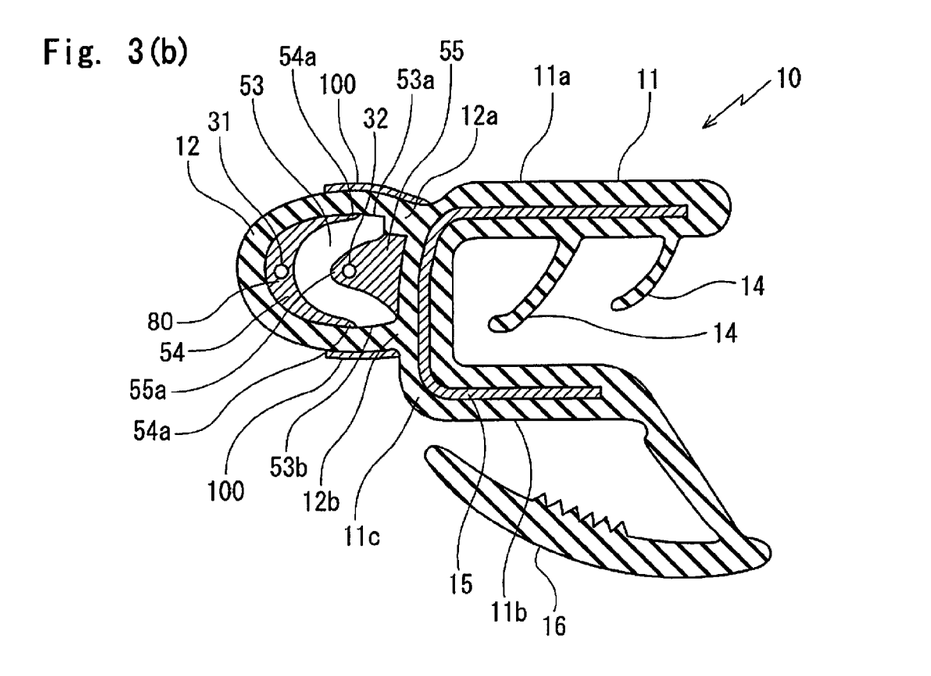

In the present embodiment, an inner-cabin side end 100a and an outer-cabin side end 100b of the coating layer 100 cover the inner-cabin side end 12a and the outer-cabin side end 12b of the hollow part 12, respectively, from the outer side. But, as shown in FIG. 3(a), the inner-cabin side end 100a and the outer-cabin side end 100b of the coating layer 100 may be extended to cover a corner part on an inner-cabin side and a corner part on an outer-cabin side of the installation base member 11, respectively. The structure further prevents the coating layer 100 from peeling by following up bending. In the present embodiment, the coating layer 100 covers the whole outer peripheral surface of the outer coat of the hollow part 12. But, as shown in FIG. 3(b), the coating layer 100 may cover only appropriate parts of the outer peripheral surface of the outer coat of the hollow part 12. Specifically, the appropriate parts are on the parts of the inner peripheral surface having the inner-cabin side end 53a and the outer-cabin side end 53b of the space 53 continuously provided directly thereon.

A material forming the coating layer 100 necessitates strength of not cracking when subjected to a sharp edged object. At the same time, the material is required to secure sensing capability of the sensor because the material which is too hard is not capable of securing the sensing capability.

A plurality of samples having the materials as the coating layers 100 were subjected to a crack test especially paying attention to the hardness of the materials. An object of the test was to evaluate durability of the materials against the cracks by strongly rubbing a minus screw driver (not shown) as a convex substance 400 against the thin parts of the hollow part 12. The test assumed that the convex substance 400, an automobile key for example, strongly abutted the thin parts of the hollow part 12 without the conductive part 54 on the upper part of the hollow part and the conductive part 55 on the lower part of the hollow part from the inner-cabin side while getting on or off the automobiles. A top end of the minus screw driver was 4 mm (milli-meter) wide and 0.6 mm (milli-meter) thick. The sample without a coating cracked in a single rub in the crack test. Accordingly, when number of rub before the material forming the coating layer 100 cracked was more than one, the coating was regarded as effective.

The samples were molded by simultaneously coextruding chosen resin materials and the outer peripheral surfaces of the outer coats of pressure sensitive sensors 80 so that the resin materials covered the outer peripheral surfaces of the outer coats of pressure sensitive sensors 80 from the outer side. Each of the materials thus chosen were capable of following the bending, did not peel under a high temperature and a lower temperature conditions in which the sensor was generally used, and firmly adhered to the installation base member 11 molded by extrusion. Also, each of the materials thus chosen were durable under a high temperature atmosphere (not less than 200° C.) for some seconds during an operation of coating the hollow part 12. A film thickness of the coating layer 100 was not more than one tenth of the thickness of the outer coat of the hollow part 12 for weakening an effect on the sensing capability of the sensor.

Figure 4:
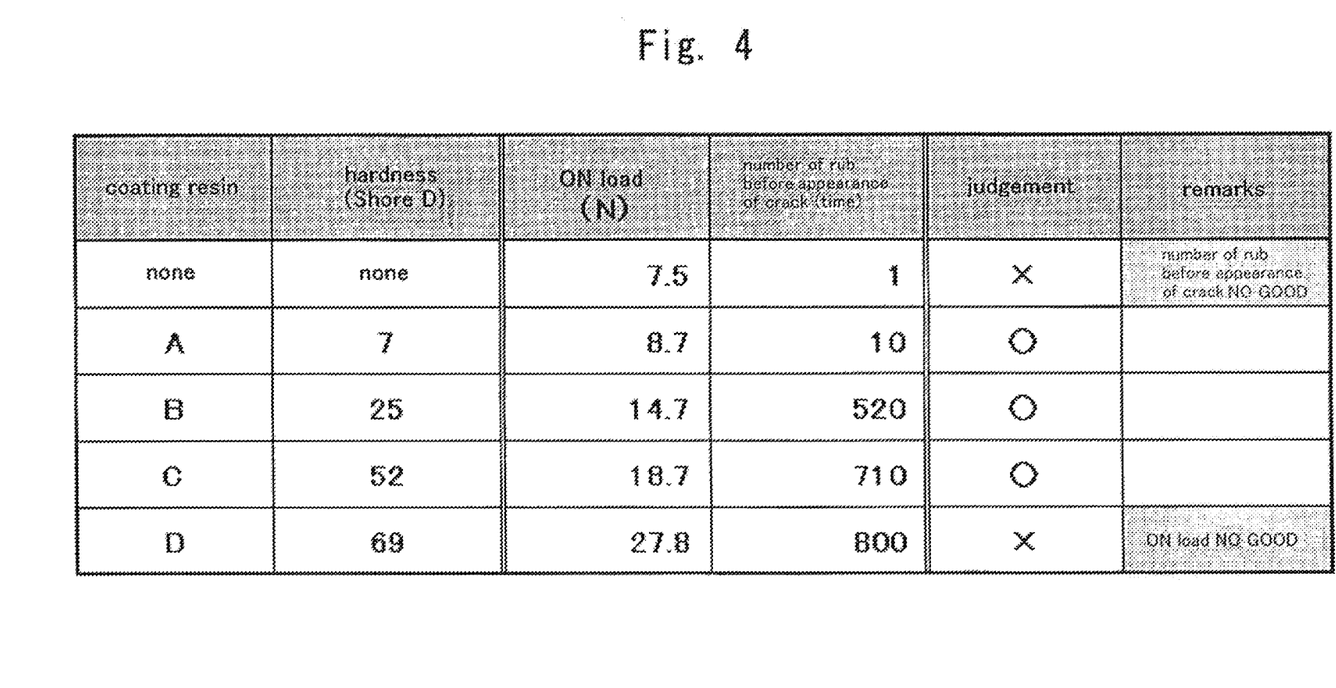
FIG. 4 is a chart showing a relation among Shore D hardness, ON load and number of rub before appearance of crack on materials forming the coating layer on a hollow part of the protector with the sensor according to the embodiment of the present invention.

The results are shown in FIG. 4.

In the test, the hollow part 12 of the sample without the coating layer (coating "non") cracked by the singular rub by the minus screw driver. The hollow parts 12 of the samples (coating resins "A", "B", "C", "D") having Shore D hardness of not less than 7 did not crack when rubbed by the minus screw driver twice. The thickness of the coating layers thus formed fell within a range of about 200 to 700 μm.

The hardness was measured based on JIS K 6253.

In addition, ON load (N) to be applied on the samples (coating resins "A" to "D") was measured. The ON load (N) is a load necessary for detecting the object by touch between the two conductive parts in the pressure sensitive sensor 80 with each other when the pressure sensitive sensor 80 is pressed from outside. The hollow parts 12 with the coating layers 100 are inferior to the hollow part 12 without the coating layer in flexibility of the sensor 80 and require larger pressing load for the two conductive parts to come into contact with each other. But in case the hollow parts 12 require the load which is too large, the hollow parts 12 are inferior in performance of the pressure sensitive sensor 80. Accordingly, the load to be applied on the hollow parts 12 needs to be controlled and moderate. In other words, as the object is disposed between the panel (the sliding door 1) and the body side opening when the sliding door 1 is moved towards a closed position, the object makes contact with the hollow part 12, a corresponding electric signal generates in the sensor 80 and change in electric signal in the sensor 80 detects the object. An upper limit on hardness of a coating material is placed for obtaining the electric signal at least for detecting the object. Since the sensors of ordinary touch sensors function at the load of not more than 20 N for turning the sliding door 1 to the other way when opening the sliding door 1, the hardness (Shore D hardness) which allows the sensors to operate at the ON load of not more than 20 N is necessary.

Figure 5:
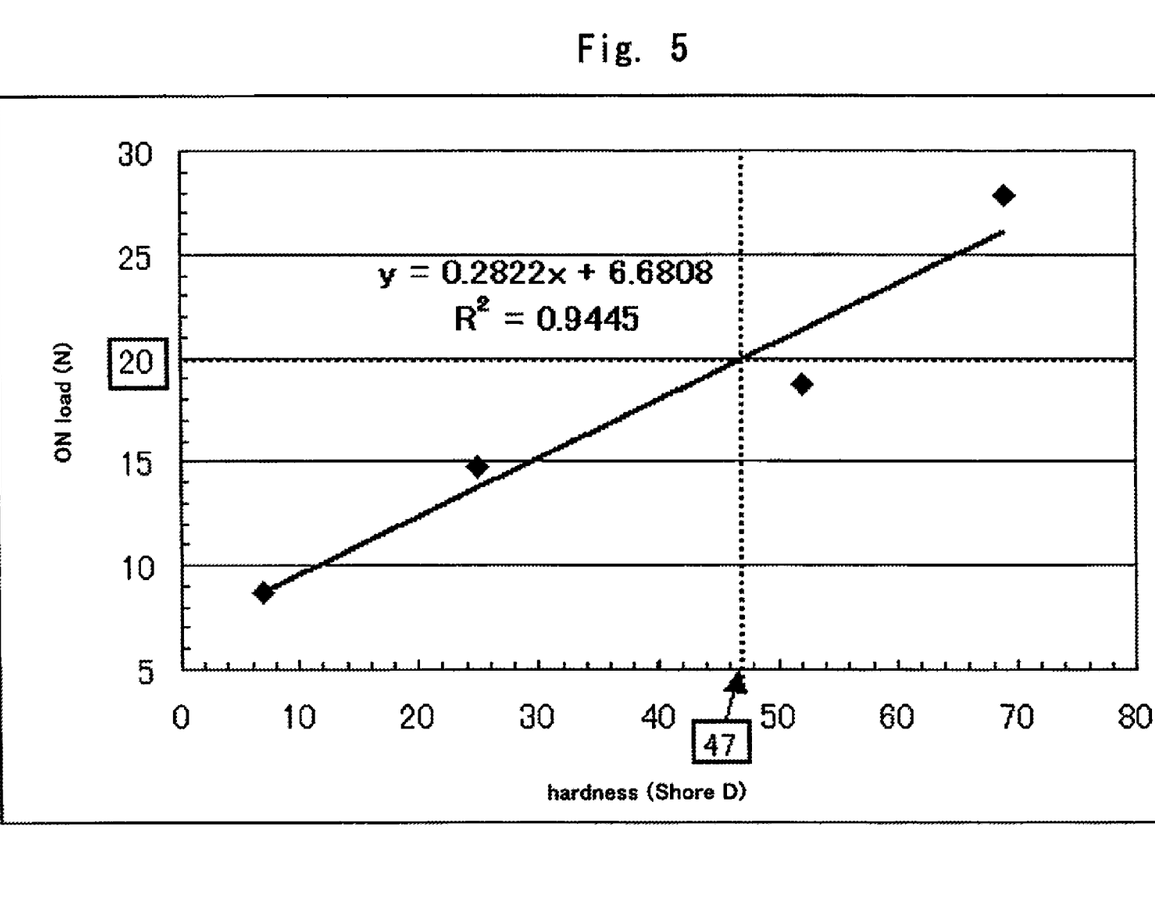
FIG. 5 is a chart showing a relation between the Shore D hardness and the ON load of the material forming the coating layer on the hollow part of the protector with the sensor according to the embodiment of the present invention.

FIG. 5 shows a relation between the hardness (Shore D hardness) and the ON load (N). Specifically, the relation was plotted, subjected to a multi regression analysis by Excel and shown by an approximate curve.

The results show that the material necessitates the hardness (Shore D hardness) of not more than 47 for the sensor to operate at the ON load of not more than 20 N.

When the thickness of the coating layer is thick, the coating layer is expected to be durable against the rub and when the thickness of the coating layer is thin, the ON load is expected to be controlled to be low. Based on these expectations as well as FIG. 4 and FIG. 5, the resin material necessitates the hardness (Shore D hardness) that falls within a range of not less than 7 and not more than 47 for being effective against the cracks on the hollow part 12 of the touch sensors and preventing damages on the sensor performance (ON load).

Accordingly, the material forming the coating layer 100 on the outer peripheral surface of the outer coat of the hollow part 12 preferably has the Shore D hardness that falls within a range of not less than 7 and not more than 47. Covering the hollow part 12 with the coating layer 100 as shown in FIG. 1, FIG. 2, FIG. 3(*a*) and FIG. 3(*b*) is technically difficult so that the thickness of the coating layer 100 tends to vary. Since the thickness conceivably affects the rub and the ON load, the resin material more preferably has the Shore D hardness of 10 to 40, and most preferably Shore D hardness of 20 to 30. When the hardness of the resin material falls within the range, resultant products are stably produced, which keep durability against the rub despite a considerable variety of the thickness of the coating layer and satisfy the ON load.

According to the protector 10 with the sensor, the coating layer 100 covers at least the outer peripheral surface of the outer coat of the hollow part 12 having the inner-cabin side end 53*a* and the outer-cabin side end 53*b* of the space 53 continuously provided directly on the inner peripheral surface thereof. Accordingly, even in case convex substances 400, automobile keys for example, strongly abut the hollow part 12 while getting on or off the automobiles, the protector 10 with the sensor endures an impact on the hollow part 12 caused by the abutment and efficiently prevents damages or cracks on thin parts of the hollow part 12.

The simple structure that the coating layer 100 covers the hollow part 12 prevents loss of the sensor function caused by water entering from the hollow part 12, and malfunction including improper opening or closing of the sliding door 1 or the sun roof 2.

In the present embodiment, the coating layer 100 was integrally molded with the hollow part 12 by simultaneous extrusion while the hollow part 12 was being molded by extrusion. But the coating layer 100 may be formed on the hollow part 12 by application. Forming the coating layer 100 by application enables simple and instantaneous formation of the coating layer 100 on appropriate parts of the hollow part 12. On the other hand, the coating layer formed by integral molding is firm on the hollow part, which is uniform in thickness without unevenness as compared with the coating layer formed by application. While the coating layer 100 can be adhered to the hollow part 12 by means of binder including adhesive, this method of forming the coating layer 100 steeply increases cost, and therefore is not favorable.

While the present embodiment specifies an example that the installation base member 11, the hollow part 12 and the sensor 80 are integrally molded, the installation base member 11, the hollow part 12 and the sensor 80 may be separately molded so that the installation base member 11 and the hollow part 12 are fixed by adhesive or adhesive tape, and the sensor 80 is inserted in the hollow part 12 for unification. Alternatively, any two of the installation base member 11, the hollow part 12 and the sensor 80 may be integrally molded and a remaining member is separately molded.

In the present embodiment, the installation base member 11 has a plurality of holding lips 14 formed inside and a core 15 having a substantially U-shaped cross section embedded therein. But the installation base member 11 may have only one holding lip 14, 14 or may be without the core 15 embedded therein. Also, the installation base member 11 may have any shape as long as the installation base member 11 has a part thereof for fixing the hollow part 12 and the sensor 80 thereon, of which examples include the U-shaped cross section of the present embodiment. Methods of fixing the hollow part 12 and the sensor 80 on the sliding door 1 vary, including use of adhesive tape as well as gripping and fitting the hollow part 12 and the sensor 80.

The present embodiment specifies an example that the protector 10 with the sensor is installed on the sliding door 1 side of the automobile, which slides frontward and rearward. But the protector 10 with the sensor may be installed on the body side opening for detecting the object between the sliding door and the body side opening.

Also, the protector 10 with the sensor is applicable to a back door or a sun roof 2 (FIG. 7).

We claim:

1. A protector with a sensor comprising:
an installation base member operatively coupled on at least one of a peripheral edge of a panel or a peripheral edge of an opening of an automobile body, said panel being moveable between at least two positions to open and close said opening of the automobile body, the panel being selected from the group consisting of a door and a sun roof of an automobile; and
a hollow part unified with the installation base member, the hollow part including an outer coat having an inner peripheral surface and an outer peripheral surface, the hollow part having a shape of a tube, the hollow part having core wires, first and second conductive parts, and a space provided therein, the hollow part comprising synthetic rubber having flexibility, each of the first and second conductive parts having a respective one of the core wires embedded therein, the space being positioned between the first and second conductive parts; the hollow part having an inner-cabin side end and an outer-cabin side end each being connected with the installation base member, the inner-cabin side end and the outer-cabin side end being at a distance from each other along the installation base member in which:
when an object is disposed between said panel and said opening, and makes contact with said hollow part when said panel is moved towards a closed position, an electric signal provides an indication that said object is in said opening; and
said core wires drawn out in a longitudinal direction of said hollow part, each of the core wires including a respective lead joined with a control unit, wherein:
said first conductive part positioned within the hollow part between the inner-cabin side end and the outer-cabin side end adjacent the installation base member and said second conductive part spaced apart from the first conductive part; said first and second conductive parts shaped and positioned in a manner that an inner-cabin space end and an outer-cabin space end of said space are defined on the inner peripheral surface of the outer coat of said hollow part;
a coating layer only a first range of the outer peripheral surface of the outer coat from the inner-cabin side end of the hollow part to a part of the outer peripheral surface opposite the inner-cabin space end and a second range of the outer peripheral surface of the outer coat from the outer-cabin side end of the hollow part to a part of the outer peripheral surface opposite the outer-cabin space end, wherein the first range is separated from the second range by a portion of the outer peripheral surface of the outer coat void of a coating; and
the coating layer having a hardness higher than that of the hollow part.

2. The protector with the sensor as claimed in claim 1, wherein: a hardness of a material forming the coating layer is equal to or less than a hardness at which at least said electric signal is obtained.

3. The protector with the sensor as claimed in claim 1, wherein: Shore D hardness of the material forming the coating layer is not more than 47.

4. The protector with the sensor as claimed in claim 1, wherein: the first conductive part has a convex shape and the second conductive part has a concave shape, and said first and second conductive parts are shaped and positioned in a manner that said space substantially has a V-shaped cross section, said space substantially has a uniform width in cross section and an opening of the V-shaped cross section faces the side of said installation base member.

5. The protector with the sensor as claimed in claim 2, wherein: said installation base member, said hollow part, said first and second conductive parts and said core wires are integrally molded.

6. The protector with the sensor as claimed in claim 2, wherein: Shore D hardness of the material forming the coating layer is not more than 47.

7. The protector with the sensor as claimed in claim 2, wherein: the first conductive part has a convex shape and the second conductive part has a concave shape, and said first and second conductive parts are shaped and positioned in a manner that said space substantially has a V-shaped cross section, said space substantially has a uniform width in cross section and an opening of the V-shaped cross section faces the side of said installation base member.

8. The protector with the sensor as claimed in claim 3, wherein: the first conductive part has a convex shape and the second conductive part has a concave shape, and said first and second conductive parts are shaped and positioned in a manner that said space substantially has a V-shaped cross section, said space substantially has a uniform width in cross section and an opening of the V-shaped cross section faces the side of said installation base member.

9. The protector with the sensor as claimed in claim 6, wherein: the first conductive part has a convex shape and the second conductive part has a concave shape, and said first and second conductive parts are shaped and positioned in a manner that said space substantially has a V-shaped cross section, said space substantially has a uniform width in cross section and an opening of the V-shaped cross section faces the side of said installation base member.

10. The protector with the sensor as claimed in claim 3, wherein: said installation base member, said hollow part, said first and second conductive parts and said core wires are integrally molded.

11. The protector with the sensor as claimed in claim 6, wherein: said installation base member, said hollow part, said first and second conductive parts and said core wires are integrally molded.

12. The protector with the sensor as claimed in claim 4, wherein: said installation base member, said hollow part, said first and second conductive parts and said core wires are integrally molded.

* * * * *